Figure 1:
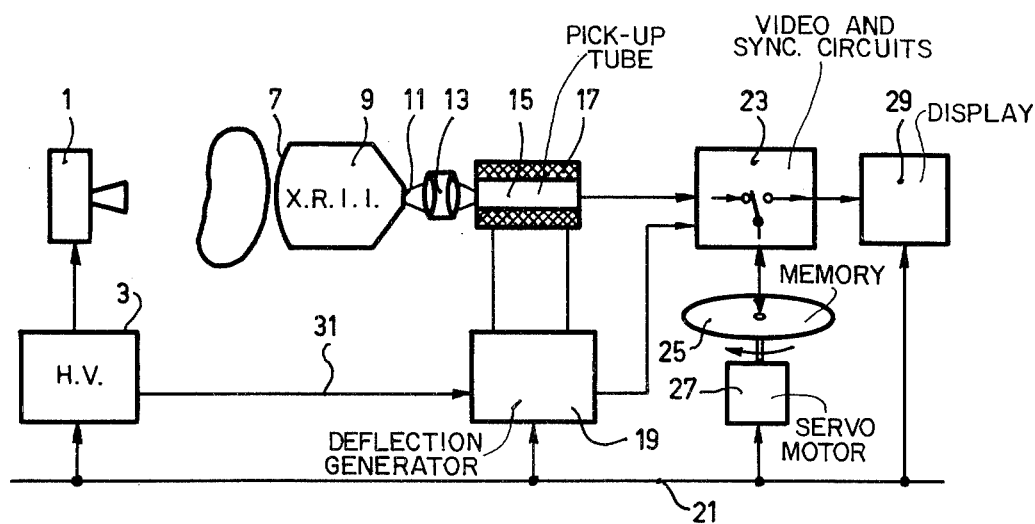

United States Patent [19]

Cramer

[11] 4,123,786

[45] Oct. 31, 1978

[54] X-RAY EXAMINING DEVICE COMPRISING A TELEVISION CHAIN WHICH INCLUDES A MEMORY

[75] Inventor: Rudy R. Cramer, Eindhoven, Netherlands

[73] Assignee: U.S. Philips Corporation, New York, N.Y.

[21] Appl. No.: 809,847

[22] Filed: Jun. 24, 1977

[30] Foreign Application Priority Data

Jul. 7, 1976 [NL] Netherlands .......................... 7607475

[51] Int. Cl.² .............................................. H04N 5/79
[52] U.S. Cl. ...................................... 360/35; 358/111; 360/37; 360/38; 358/148
[58] Field of Search ........................ 360/35, 37, 38, 33; 358/127, 111, 148

[56] References Cited

U.S. PATENT DOCUMENTS 3,383,463  5/1968  Goodell ................................. 360/37
3,647,953  3/1972  Booker ................................... 360/33

*Primary Examiner*—Bernard Konick
*Assistant Examiner*—Alan Faber
*Attorney, Agent, or Firm*—Frank R. Trifari; Jack E. Haken

[57] ABSTRACT

In an X-ray examining device comprising a television chain and an image recording memory, the deflection signals of the television pick-up tube and a drive of the recording memory are synchronized via the power supply mains. When the high voltage generator is switched on, inductive loading of the power supply mains occurs and the resultant phase shifts cause errors in the synchronization. This gives rise to the appearance of artifacts in a monitor image formed from the recording via the memory. Uncoupling of the synchronization from the power supply mains between an instant some time before and an instant some time after switching of the high voltage generator prevents the undesired recording errors.

2 Claims, 2 Drawing Figures

X-RAY EXAMINING DEVICE COMPRISING A TELEVISION CHAIN WHICH INCLUDES A MEMORY

The invention relates to an X-ray examining device which comprises at least one high voltage generator, an X-ray source, an X-ray detector in an image intensifier and an image pick-up tube, and also electronic circuits and a memory for reading a charge image, produced on a photosensitive target of the image pick-up tube by the X-ray source via the image intensifier, for recording the image in the memory, and for displaying the image on a display screen.

An examining device comprising a television chain of the described kind is known from U.S. Pat. No. 3,647,954. In a device thus constructed, the reading of an X-ray image by means of the image pick-up tube as well as the recording of this X-ray image in a memory and the display thereof must be mutually synchronized. A disturbance of the synchronization will cause the desired image information to be lost, so that a completely new recording must be made. In the described X-ray examining device comprising a television chain, line and frame signals for the recording, reading and display of an X-ray image can be synchronized with the zero crossing of the phase of the power supply mains for the X-ray examining device. The power supply mains is generally considered to be very stable. A disturbance of the synchronization, therefore, takes place only if the phase of the power supply mains is disturbed. A disturbance of the phase of power supply mains, however, may occur locally if a heavy inductive or capacitive load is connected to the power supply mains.

The invention is based on the recognition of the fact that a high voltage generator of an X-ray system constitutes an inductive load such that a distrubance of the phase occurs when this high voltage generator is switched on.

To this end, the X-ray examining device in accordance with the invention is characterized in that line and frame deflection signals, produced by electronic circuits, for reading the charge image, for image recording and for image display are synchronized with the zero crossing of the phase of the power supply mains for the X-ray examining device, the said synchronization being uncoupled from the power supply mains at least during the switching on of the high voltage generator.

It has been found advantageous to suppress the synchronization of the line signals and frame signals with the zero crossing of the phase of the power supply mains by means of a transistor, at least during the operation of a high voltage generator. The suppression of signals by means of a transistor, for example in the cut-off state, is a generally known and reliable method of signal control. The circumstances in which the transistor must conduct or block can be translated into a logic signal which controls the transistor, by simple electronic digital techniques.

It has been found that in an X-ray examining device which comprises a plurality of X-ray sources, high voltage generators, image intensifiers and television chains, disturbance of the synchronization of the television images can be prevented by suppressing the synchronization of the line signals and frame signals with the zero crossing of the phase of the power supply mains during the operation of a high voltage generator and X-ray source and during an adequate period therebefore and thereafter. As a result of the continued suppression of the synchronization of the television chain with the power supply mains for some time after the operation of a high voltage generator, it is ensured that the power supply mains has recovered from the disturbance by the high voltage generator.

The invention will be described in detail hereinafter with reference to the diagrammatic drawing.

Figure 2:
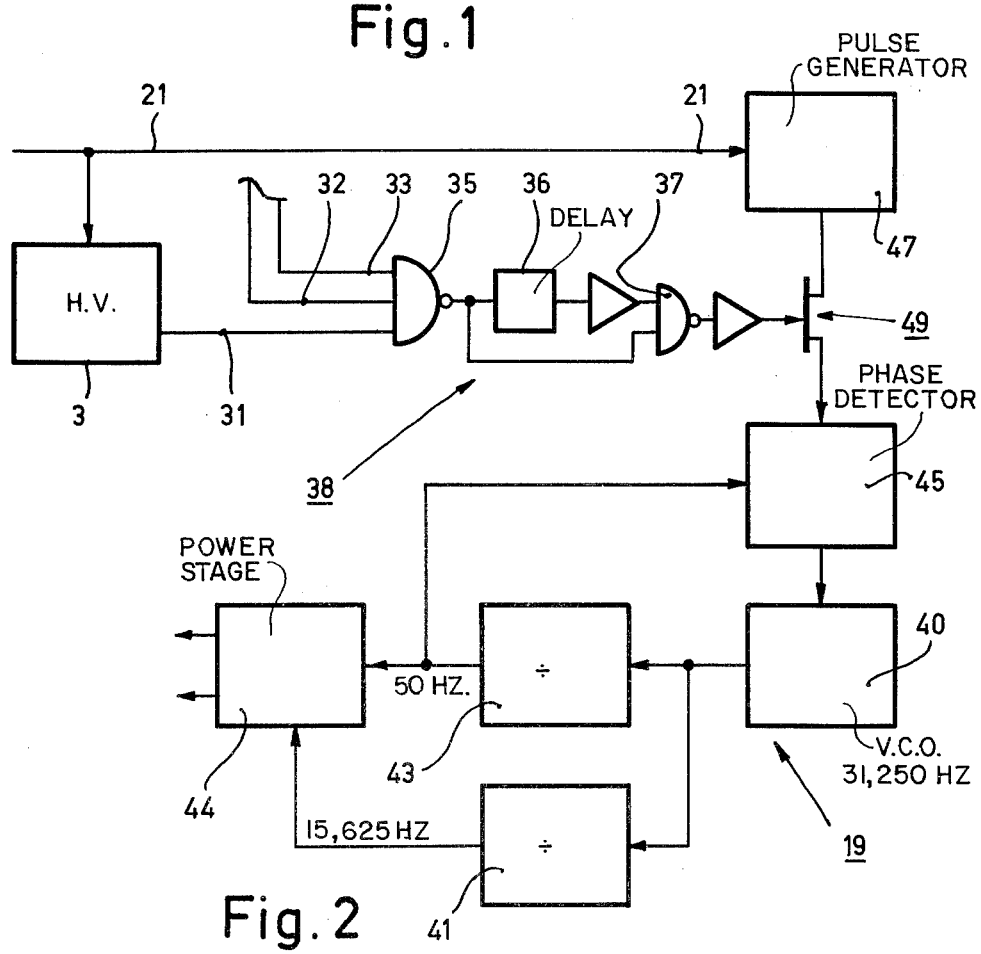

FIG. 1 is a block diagram of an X-ray examining device according to the invention, and FIG. 2 is a detailed view of an essential part of the electronic circuit of the X-ray examining device in accordance with the invention.

The arrangement shown in FIG. 1 comprises an X-ray source 1 which is powered by a high voltage generator 3. The radiation produced by the X-ray source 1 produces an X-ray image on the entrance screen 7 of an image intensifier 9, the said image being intensified and displayed on the output screen 11 in a reduced scale. The image produced on the output screen 11 is projected, via a system of lenses 13, on a photo-sensitive layer of an image pick-up tube 15. This pick-up tube 15 is enveloped by a deflection unit 17 which is driven by a deflection voltage generator 19. The frequency of the voltage generated by the generator 19 is synchronized with the zero crossing of the power supply mains 21. The high voltage generator 3 is also connected to the power supply mains 21. In an electronic circuit 23, a synchronization signal is added to the video signal 15 which is generated, in cooperation with the image pick-up tube 15, the deflection unit 17 and the generator 19, when the X-ray image projected on the photosensitive layer is read. Via the electronic circuit 23, the video signal and the synchronization signal added thereto are recorded in a magnetic disc memory 25 which is driven by a servomotor 17. The X-ray image stored in the disc memory 25 is displayed on a display screen 29 by a switch in the electronic circuit 23. A signal which indicates that the high voltage generator 3 is switched on is applied to the generator 19 via a signal lead 31. The synchronization of the generator 19 with the power supply mains 21 is thus interrupted until the disturbance of the power supply means 21 has disappeared after the switching off of the inductive load of the high voltage generator 3. The interruption of the synchronization is of such a short duration that there is no risk of drift of the line and frame frequency generated by the generator 19.

The generator 19 and its synchronization with the power supply mains will be described in detail with reference to FIG. 2. The generator 19 comprises a voltage-controlled oscillator 40 whereto dividers 41 and 43 are connected. The oscillator generates a signal having a frequency of 31,250 Hz. The divider 41 divides the frequency by 2, so that the television line frequency (15,625 Hz) can be derived from the output of the divider 41. The divider 43 divides the oscillator frequency by 625, so that the television frame frequency (50 Hz) can be derived from the output of the divider 43. The television line frequency and frame frequency are applied to a power stage 44 which drives the deflection unit 17 (see FIG. 1). The television frame frequency is also applied to a phase detector 45.

A pulse generator 47 derives a synchronization signal for the oscillator 40 from the frequency (50 Hz) of the power supply mains 21, said synchronization signal being applied to the phase detector 45 via a transistor 49. From the phase difference between the synchronization signal and the generated television frame frequency an error signal is derived whereby the oscillator 40 is controlled so that the frequency generated thereby is stabilized.

When the high voltage generator 3 is switched on, so that the power supply mains 21 is inductively loaded and is subject to a phase disturbance, the synchronization signal derived from the power supply mains 21 is blocked by the activation of a logic circuit 38. The logic circuit 38 causes the transistor 49 to block. The input of the logic circuit 38 is formed by an inverting OR-gate 35 so that, when other high voltage generators or other heavy inductive or capacitive loads are switched on, intervention can take place in the synchronization of the oscillator 40 via the inputs 32, 33 of the gate 35. A step has been taken to ensure that the synchronization suppression is not immediately cancelled after the switching off of the high voltage generator 3 and all other loads, in order to enable the power supply mains 21 to recover from the disturbance. To this end, the logic circuit 38 comprises a second inverting OR-gate 37 whereto the output of the gate 35 is connected directly and via a time delay 36. As a result, after the switching off of the high voltage generator 3 and other heavy loads, the synchronization suppression is continued for some time (for example, 20–40 ms) as a result of the time delay unit 36. The total period of time during which the voltage control oscillator 40 is not synchronized with the power supply mains is so short that drift of the frequency generated by the oscillator 14 cannot form a significant disturbance.

What is claimed is:
1. An X-ray examining device which comprises:
   a high voltage generator;
   an X-ray source;
   an X-ray detector in an image intensifier,
   an image pick-up tube; and
   electronic circuit means and a memory for reading a charge image produced on a photosensitive target of the image pick-up by the X-ray source via the image intensifier, for recording the image in the memory, and for displaying the image on a display screen;
   wherein said electronic circuit means are connected to produce line and frame deflection signals, for reading the charge image, for image recording and for display which are synchronized with the zero crossing of the phase of power supply mains and to uncouple the said synchronization from the power supply mains at least during the switching on of the high voltage generator.
2. An X-ray examining device as claimed in claim 1, wherein the synchronization is uncoupled by a transistor.